United States Patent
Qi et al.

(10) Patent No.: US 12,524,495 B2
(45) Date of Patent: Jan. 13, 2026

(54) SYSTEMS AND METHODS FOR END-TO-END LEARNING OF OPTIMAL DRIVING POLICY

(71) Applicant: Toyota Motor Engineering & Manufacturing North America, Inc., Plano, TX (US)

(72) Inventors: Xuewei Qi, Mountain View, CA (US); Kentaro Oguchi, Mountain View, CA (US); Yongkang Liu, Plano, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1259 days.

(21) Appl. No.: 17/339,063

(22) Filed: Jun. 4, 2021

(65) Prior Publication Data
US 2022/0388522 A1 Dec. 8, 2022

(51) Int. Cl.
*G06N 3/04* (2023.01)
*G06F 18/214* (2023.01)
(Continued)

(52) U.S. Cl.
CPC ........ *G06F 18/2148* (2023.01); *G06F 18/251* (2023.01); *G06N 3/04* (2013.01); *G06N 3/08* (2013.01); *G06V 20/56* (2022.01)

(58) Field of Classification Search
CPC .................. G06F 18/2148; G06V 20/56
See application file for complete search history.

(56) References Cited

U.S. PATENT DOCUMENTS 10,940,863 B2   3/2021  Palanisamy et al.
12,001,958 B2 * 6/2024  Kamenev ................. G06T 7/20
(Continued)

FOREIGN PATENT DOCUMENTS

CN   109615064 A   4/2019
CN   109656134 A   4/2019
(Continued)

OTHER PUBLICATIONS

Xu, Xin, et al. "Actor-critic reinforcement learning for autonomous control of unmanned ground vehicles." Science Robotics 354 (2016): 42-47. (Year: 2016).*
(Continued)

*Primary Examiner* — Daniel T Pellett
(74) *Attorney, Agent, or Firm* — DINSMORE & SHOHL LLP

(57) ABSTRACT

A system for learning optimal driving behavior for autonomous vehicles comprises a deep neural network, a first stage training module, and a second stage training module. The deep neural network comprises a feature learning network configured to receive sensor data from a vehicle as input and output spatial temporal feature embeddings and a decision action network configured to receive the spatial temporal feature embeddings as input and output an optimal driving policy for the vehicle. The first training stage module is configured to, during a first training stage, train the feature learning network using object detection loss. The second stage training module is configured to, during a second training stage, train the decision action network using reinforcement learning.

17 Claims, 13 Drawing Sheets

(51) Int. Cl.
*G06F 18/25* (2023.01)
*G06N 3/08* (2023.01)
*G06V 20/56* (2022.01)

(56) References Cited

U.S. PATENT DOCUMENTS

| | | |
|---|---|---|
| 2014/0236466 A1 | 8/2014 | Doron |
| 2016/0330394 A1 | 11/2016 | Shahraray et al. |
| 2018/0189581 A1* | 7/2018 | Turcot ................. G06V 20/597 |
| 2020/0097003 A1 | 3/2020 | Wray et al. |
| 2021/0035314 A1* | 2/2021 | Shu ........................ G01S 17/89 |
| 2021/0081715 A1* | 3/2021 | Rosman ................ G06N 3/045 |
| 2021/0103744 A1 | 4/2021 | Gao et al. |
| 2021/0117738 A1* | 4/2021 | Liu ...................... G06V 10/454 |

FOREIGN PATENT DOCUMENTS

| | | |
|---|---|---|
| CN | 111121849 A | 5/2020 |
| CN | 111354214 A | 6/2020 |
| CN | 111402588 A | 7/2020 |
| CN | 111738372 A | 10/2020 |
| CN | 111754581 A | 10/2020 |
| EP | 3531391 A1 | 8/2019 |
| EP | 3618026 A1 | 3/2020 |
| WO | 2017079474 A2 | 5/2017 |
| WO | 2017192358 A1 | 11/2017 |

OTHER PUBLICATIONS

Kocic, Jelena et al., "An End-to-End Deep Neural Network for Autonomous Driving Designed for Embedded Automotive Platforms", 34 pages, Published online May 3, 2019, https://www.ncbi.nlm.nih.gov/pmc/articles/PMC6539483/.

Wu, Tianhao et al., "End-to-End Driving Model for Steering Control of Autonomous Vehicles with Future Spatiotemporal Features", 2 pages, Published 2019, https://ieeexplore.ieee.org/document/8968453.

* cited by examiner

SYSTEMS AND METHODS FOR END-TO-END LEARNING OF OPTIMAL DRIVING POLICY

TECHNICAL FIELD

The present specification relates to autonomous vehicle systems, and more particularly, to systems and methods for end-to-end learning of optimal driving policy.

BACKGROUND

Learning optimal decision making and control policies (e.g., vehicle following and lane keeping) is a core functional component for autonomous vehicles. However, many autonomous vehicle decision-making learning systems have several limitations including, low robustness, limited sensing ability, low efficiency, and lack of extendibility. Many autonomous vehicle systems rely on the performance of separate object detection, tracking, and prediction models. These systems result in significant loss of information and decreased reliability since a failure at one step can propagate to the other steps and may result in a catastrophic result.

In addition, autonomous vehicle systems typically learn optimal driving policy from sensor data obtained only by the vehicle making the driving decisions, which typically has a limited sensing range and field of view. This can limit the vehicle's ability to determine optimal driving behavior, particularly in crowded driving conditions where many occlusions are present. Furthermore, autonomous vehicle systems that use deep neural networks may require significant computing power and other resources to training the neural networks. This may reduce the performance and/or extendibility of such systems. Accordingly, there is a need for an improved learning system for autonomous vehicles to learn optimal driving decisions and policy.

SUMMARY

In one embodiment, a system for learning optimal driving behavior for autonomous vehicles may include a deep neural network, a first stage training module, and a second stage training module. The deep neural network may include a feature learning network and a decision action network. The feature learning network may be configured to receive sensor data from a vehicle as input and output spatial temporal feature embeddings. The decision action network may be configured to receive the spatial temporal feature embeddings as input and output an optimal driving policy for the vehicle. The deep neural network may be trained in two stages. During a first training stage, the first stage training module may train the feature learning network using object detection loss. During a second training stage, the second stage training module may train the decision action network using reinforcement learning.

In another embodiment, a method may include training a deep neural network to receive sensor data from a vehicle as input and output an optimal driving policy for the vehicle. The deep neural network may be trained in two stages. In a first training stage, a feature learning may be trained, using object detection loss, to receive the sensor data as input and output spatial temporal feature embeddings. In a second training stage, a decision action network may be trained, using reinforcement learning, to receive the spatial temporal feature embeddings as input and output the optimal driving policy for the vehicle.

In another embodiment, a method may include receiving sensor data from a first vehicle, inputting the sensor data into a spatial feature learning network trained to output spatial feature embeddings, inputting the spatial feature embeddings into a temporal feature learning network trained to output first spatial temporal feature embeddings, receiving second spatial feature embeddings from a second vehicle, inputting the first spatial temporal feature embeddings and the second spatial temporal feature embeddings into a decision action network trained to output optimal driving policy for the first vehicle, and determining optimal driving policy for the first vehicle based on the output of the decision action network.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for end-to-end learning of optimal driving policy. Autonomous vehicles may use data collected by vehicle sensors to perform autonomous driving. In particular, autonomous vehicles may use sensor data to determine a state of the environment around the vehicle, predict future actions of vehicles and other road agents, and determine driving decisions based on the determined driving environment and predicted actions of road agents.

Autonomous vehicles may use machine learning and artificial neural networks to learn various aspects of autonomous driving. For example, one neural network may be trained to determine a driving environment based on vehicle sensor data, a second neural network may be trained to predict actions of road agents, and a third neural network may be trained to determine driving decisions. In some examples, additional neural networks may also be trained to perform other features or functionality that may be used by an autonomous vehicle system. Each of these neural networks may be trained separately and they may all be used as part of an autonomous driving vehicle system. However, training multiple neural networks separately may result in inefficiencies and lack of optimal performance.

In some examples, the different neural networks, when combined in an autonomous vehicle system, may not perform as well together as they do when operated separately. In addition, training multiple neural networks may be computationally complex and inefficient. Accordingly, in embodiments disclosed herein, a single deep neural network is trained in an end-to-end manner to receive vehicle sensor data and determine optimal driving decisions. Instead of training individual neural networks separately, the entire deep neural network is trained together, which may result in a more robust system.

In addition, in order to reduce training complexity, the deep neural network disclosed herein is trained in two stages. In a first training stage, a feature learning network of the deep neural network is trained using object detection loss. Then, in a second training stage, the entire deep neural network, including the feature learning network and a decision action network is trained using reinforcement learning. As such, the deep neural network may be trained more efficiently.

Furthermore, the system disclosed herein may receive sensor data from multiple vehicles. This may allow the system to having a wider sensing range, which may increase the reliability of the system. In particular, by receiving data from multiple vehicles, the system may have access to data that would not be available from only a single vehicle. As such, the system may be able to make more accurate driving decisions based on the larger amount of available sensor data.

Figure 1:
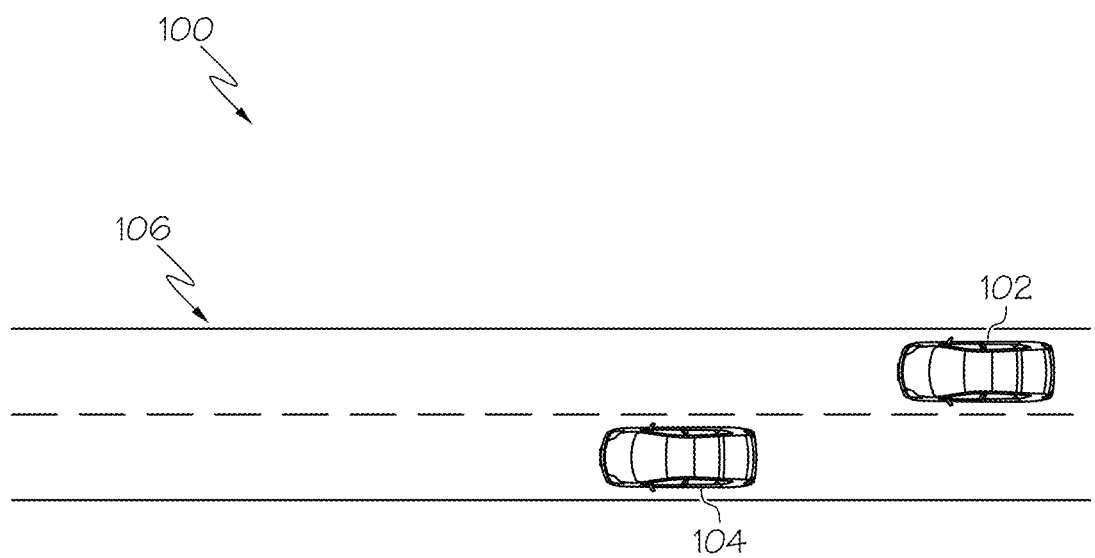
FIG. 1 depicts an example system for end-to-end learning optimal driving policy, according to one or more embodiments shown and described herein.

FIG. 1 depicts an example system 100 for learning optimal driving behavior for autonomous vehicles. The system 100 includes a vehicle 102 that drives along a road 106. In the example of FIG. 1, another vehicle 104 also drives along the road 106. In other examples, any number of vehicles may drive along the road 106. In the example of FIG. 1, the vehicle 102 is an autonomous vehicle driving by computer control.

Figure 2:
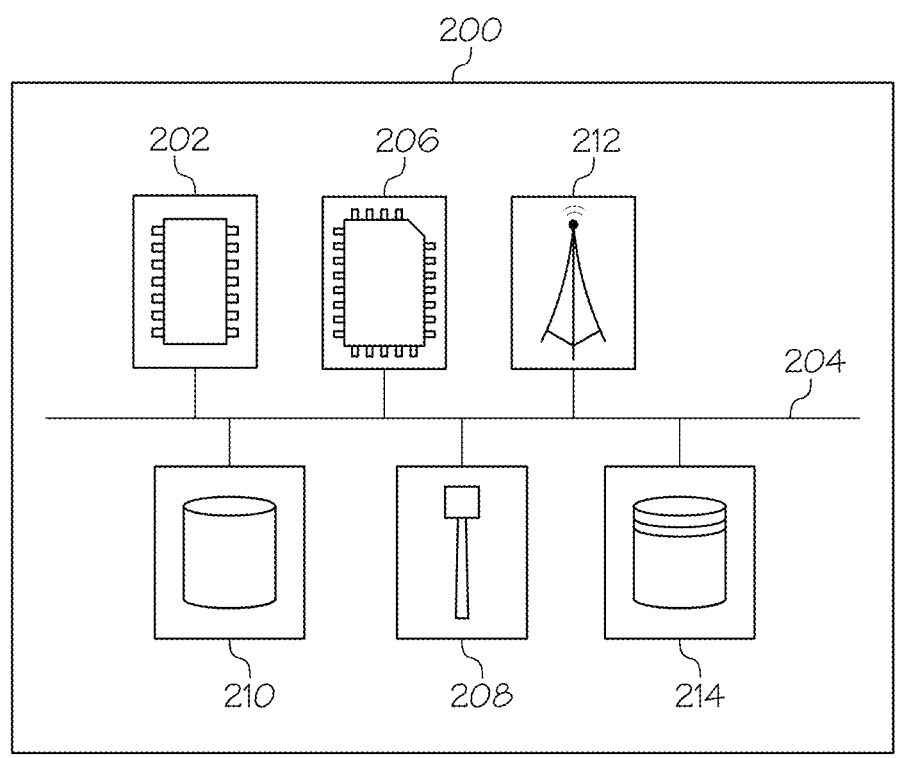
FIG. 2 depicts a schematic diagram of an example vehicle system, according to one or more embodiments shown and described herein.

FIG. 2 depicts an example vehicle system 200 included in the vehicle 102 of FIG. 1. The vehicle system 200 includes one or more processors 202, a communication path 204, one or more memory modules 206, a satellite antenna 208, one or more vehicle sensors 210, network interface hardware 212, and a data storage component 214, the details of which will be set forth in the following paragraphs. The vehicle system 200 may also include one or more modules for performing autonomous driving of the vehicle 102. Data gathered by the vehicle sensors 210 may be used by the autonomous driving module to autonomous navigate the vehicle 102. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 of the vehicle system 200 are described in further detail below with respect to FIG. 3.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system (GPS) satellites. Specifically, in one embodiment, the satellite antenna 208 includes one or more conductive elements that interact with electromagnetic signals transmitted by GPS satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. In some examples, the vehicle sensors 210 may be used to autonomously navigate the vehicle 102, as disclosed herein.

Still referring to FIG. 2, the vehicle system 200 comprises network interface hardware 212 for communicatively coupling the vehicle system 200 to other devices and systems (e.g., other vehicles or remote computing devices). The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In some examples, the network interface hardware 212 may communicate with other vehicles (e.g., the vehicle 104 of FIG. 1) using vehicle-to-vehicle (V2V) communication.

In some embodiments, the vehicle system 200 may be communicatively coupled to other vehicles or remote computing devices by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 200 comprises a data storage component 214. The data storage component 214 may store data that may be utilized by the memory modules 206 and/or other components of the vehicle system 200. For example, the data storage component 214 may store sensor data captured by the vehicle sensors 210. The data storage component 214 may also store learned parameters for a trained neural network, as described herein. Other data that may be stored in the data storage component 214 is described throughout this disclosure.

Figure 3:
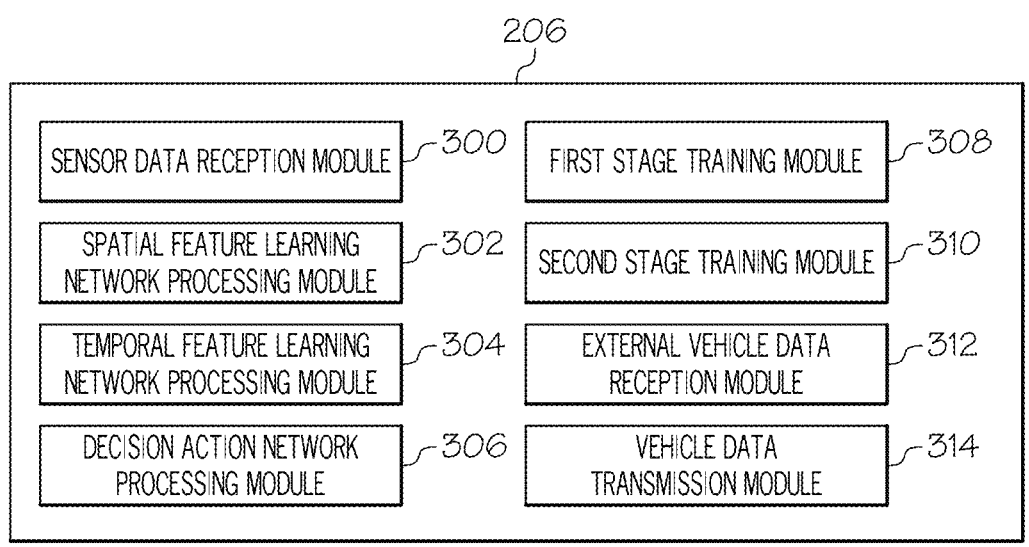
FIG. 3 depicts a schematic diagram of exemplary memory modules of the vehicle system of FIG. 2, according to one or more embodiments shown and described herein.

Now referring to FIG. 3, exemplary memory modules 206 of the vehicle system 200 are shown. The one or more memory modules 206 include a sensor data reception module 300, a spatial feature learning network processing module 302, a temporal feature learning network processing module 304, a decision action network processing module 306, a first stage training module 308, a second stage training module 310, an external vehicle data reception module 312, and a vehicle data transmission module 314. Each of the sensor data reception module 300, the spatial feature learning network processing module 302, the temporal feature learning network processing module 304, the decision action network processing module 306, the first stage training module 308, the second stage training module 310, the external vehicle data reception module 312, and the vehicle data transmission module 314 may be a program module in the form of operating systems, application program modules, and other program modules stored in the one or more memory modules 206. Such a program module may include, but is not limited to, routines, subroutines, programs, objects, components, data structures and the like for performing specific tasks or executing specific data types as will be described below.

The sensor data reception module 300 may receive sensor data captured by the vehicle sensors 210 of the vehicle system 200. The received sensor data may comprise image data, RADAR data, LiDAR data, and the like. The sensor data received by the sensor data reception module 300 may be stored in the data storage component 214. The sensor data may be used to determine driving instructions for the vehicle 102 as described herein.

Figure 4:
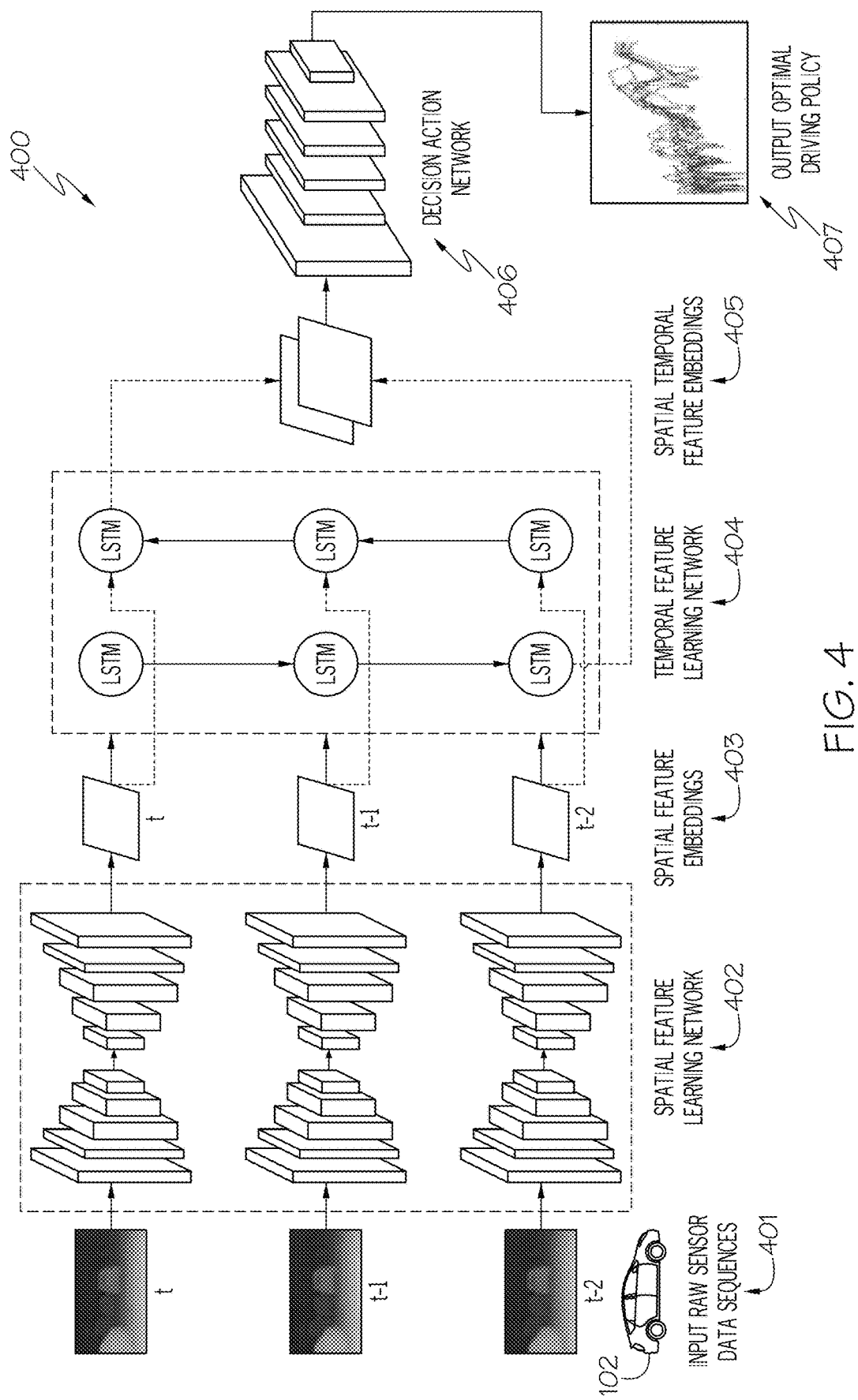
FIG. 4 depicts a schematic diagram of an example neural network architecture for learning optimal driving policy, according to one or more embodiments shown and described herein.

The spatial feature learning network processing module 302 may perform processing for a portion of a deep neural network configured to learn optimal driving policy for the vehicle 102. FIG. 4 shows a schematic diagram of an example architecture for a deep neural network 400, which may be used by the vehicle 102 to learn optimal driving policy, as described herein. The deep neural network 400 may comprise a spatial feature learning network 402, a temporal feature learning network 404, and a decision action network 406. The spatial feature learning network 402 and the temporal feature learning network 404 may be collectively referred to herein as a feature learning network.

The spatial feature learning network 402 may extract spatial information associated with an environment surrounding the vehicle 102. In particular, the spatial feature learning network 402 may receive, as input, images 401 captured by the vehicle sensors 210 and may output spatial feature embeddings. As images are captured by the vehicle sensors 210 at different time steps, each image captured at a subsequent time step may be input to the spatial feature learning network 402 as a separate frame. As such, the spatial feature learning network 402 may output a spatial feature embedding for each frame received as input. The example of FIG. 4 shows three images captured at times t, t−1, and t−2 being input to the spatial feature learning network 402. However, it should be understood that any number of image frames may be input to the spatial feature learning network 402. The spatial feature embeddings output by the spatial feature learning network 402 at different frames may be concatenated to form a higher dimensional embedding that may be feed to the temporal feature learning network 404, as discussed in further detail below.

In the illustrated example, the spatial feature learning network 402 comprises a plurality of convolutional neural network (CNN) layers. In one example, the spatial feature learning network 402 may comprise an encoder and a decoder. In this example, the spatial feature learning network 402 may output spatial feature embeddings containing information from different spatial scales. However, in other examples, the spatial feature learning network 402 may comprise other types of neural network architecture to determine spatial feature embeddings.

Referring back to FIG. 3, the spatial feature learning network processing module 302 may perform the operations of the spatial feature learning network 402. In particular, the spatial feature learning network processing module 302 may receive, as input, images received by the sensor data reception module 300 and may output spatial feature embeddings based on values of the parameters of the spatial feature learning network 402. The values of the parameters of the spatial feature learning network 402 may be learned during training of the neural network using the techniques discussed in further detail below and may be stored in the data storage component 214.

Referring still to FIG. 3, the temporal feature learning network processing module 304 may perform processing for the temporal feature learning network 404 of FIG. 4. Referring back to FIG. 4, the temporal feature learning network 404 may learn and encode temporal features of the images captured by the vehicle sensors 210. In particular, the temporal feature learning network 404 may receive the spatial feature embeddings 403 output by the spatial feature learning network 402 as input and may output spatial temporal feature embeddings 405.

In some examples, the temporal feature learning network 404 may comprise a recurrent neural network. In some examples, the temporal feature learning network 404 may comprise a plurality of long short-term memory (LSTM) layers. In the illustrated example of FIG. 4, the temporal feature learning network 404 comprises two LSTM layers. However, it should be understood that in other examples, the temporal feature learning network 404 may comprise any number of LSTM layers.

In some examples, the temporal feature learning network 404 may comprise multiple bi-directional LSTM layers. For each bi-directional LSTM, a forward pass may be used to learn a forward temporal relationship and a backward pass may be used to learn a backward temporal relationship. In the example of FIG. 4, the temporal feature learning network 404 comprises three input nodes and each node receives a spatial feature embedding corresponding to a different time step (e.g., time steps t, t−1, and t−2). However, it should be understood that in other examples, the temporal feature learning network 404 may comprise any number of input nodes. The temporal feature learning network 404 may output spatial temporal feature embeddings that represent spatial and temporal feature of the environment around the vehicle 102.

Referring back to FIG. 3, the temporal feature learning network processing module 304 may perform the operations of the temporal feature learning network 404. In particular, the temporal feature learning network processing module 304 may receive, as input, spatial feature embeddings output by the spatial feature learning network 402 and may output spatial temporal feature embeddings based on learned parameters of the temporal feature learning network 404. The values of the parameters of the temporal feature learning network 404 may be learned during training of the neural network 400 using the techniques discussed in further detail below and may be stored in the data storage component 214.

Referring still to FIG. 3, the decision action network processing module 306 may perform processing for the decision action network 406 of FIG. 4. Referring back to FIG. 4, the decision action network 406 may learn optimal driving policy for the vehicle 102 based on a predefined goal. In particular, the decision action network 406 may receive the spatial temporal feature embeddings 405 output by the temporal feature learning network 404 as input and may output optimal driving decisions 407 or driving policy.

In some examples, the decision action network 406 may comprise a plurality of fully connected layers. However, it should be understood that in other examples, the decision action network 406 may comprise any other type of neural network architecture.

Referring back to FIG. 3, the decision action network processing module 306 may perform the operations of the decision action network 406. In particular, the decision action network processing module 306 may receive, as input, temporal spatial feature embeddings output by the temporal feature learning network 404 and may output driving policy or driving decisions based on learned parameters of the decision action network 406. The values of the parameters of the decision action network 406 may be learned during training of the neural network 400 using the techniques discussed in further detail below and may be stored in the data storage component 214.

Figure 5A:
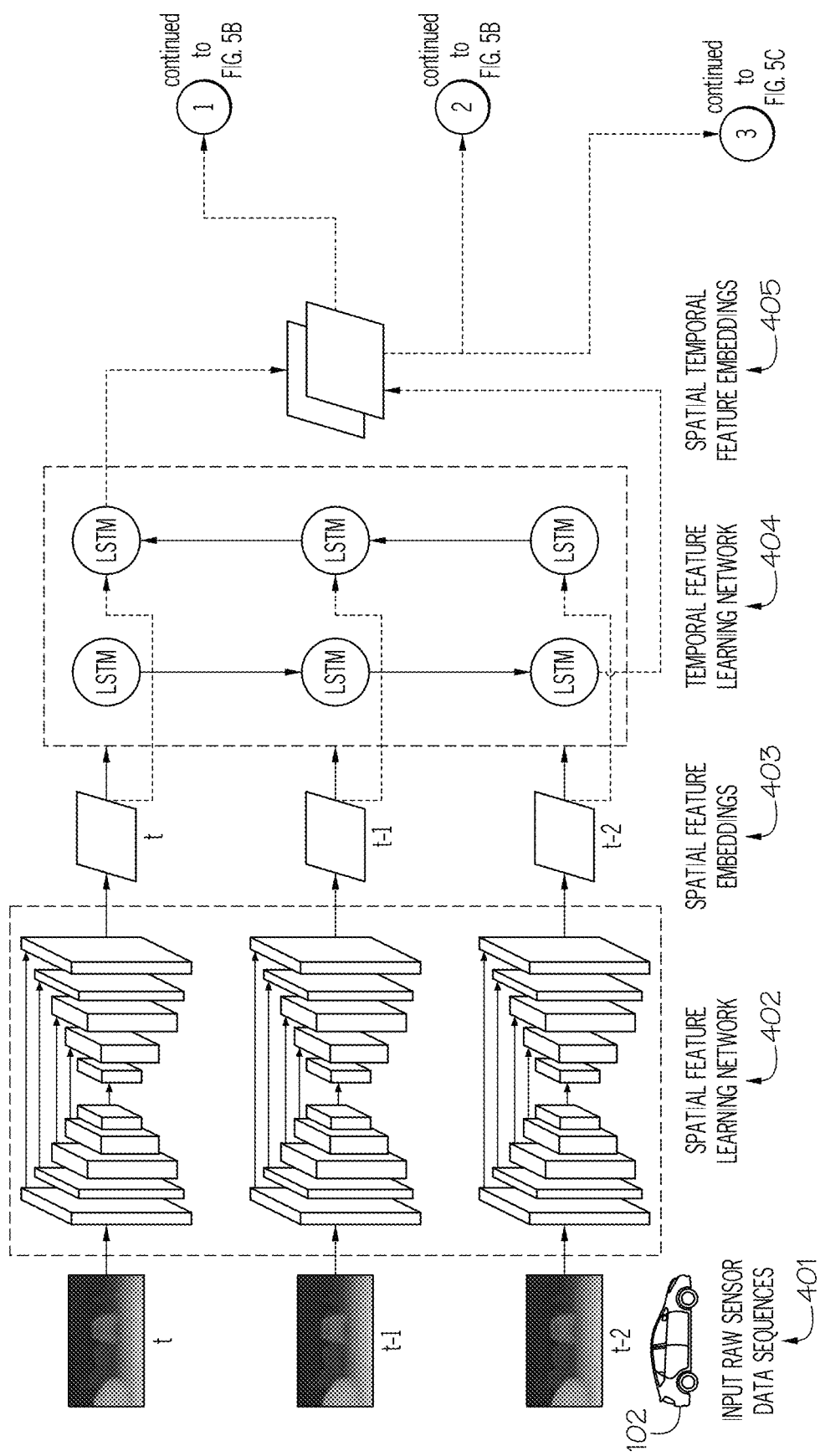
FIG. 5A depicts a schematic diagram of a first portion of an example architecture for training the neural network of FIG. 4, according to one or more embodiments shown and described herein.
Figure 5B:
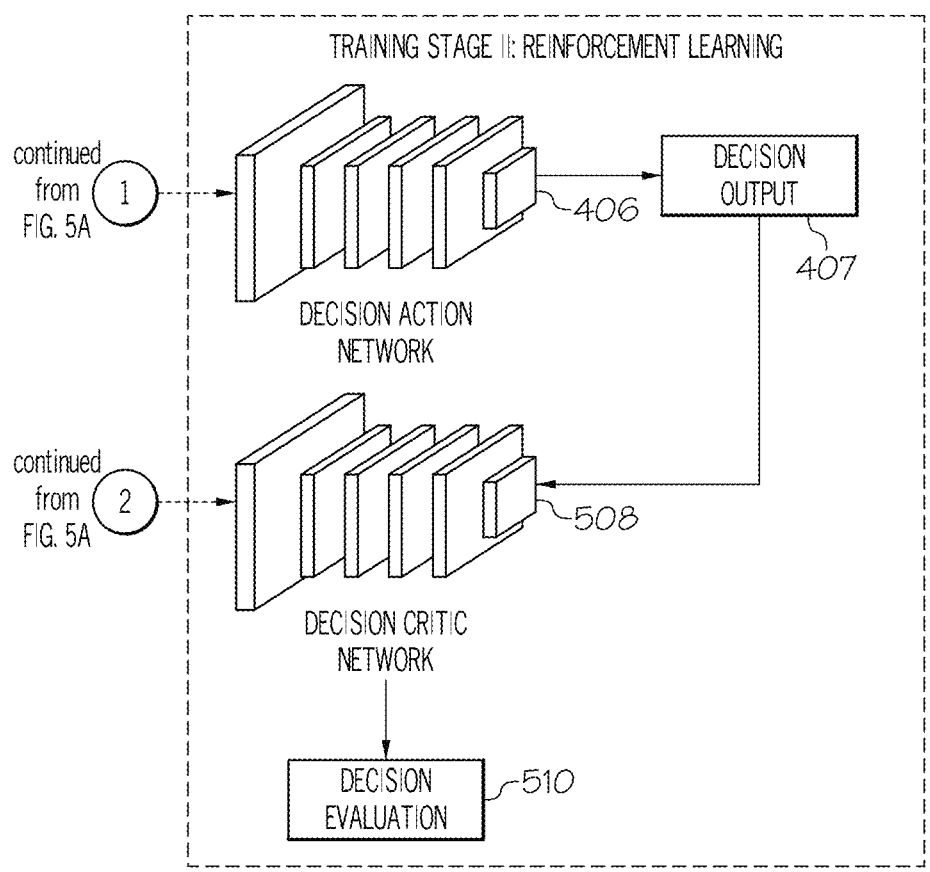
FIG. 5B depicts a schematic diagram of a second portion of an example architecture for training the neural network of FIG. 4 according to one or more embodiments shown and described herein.
Figure 5C:
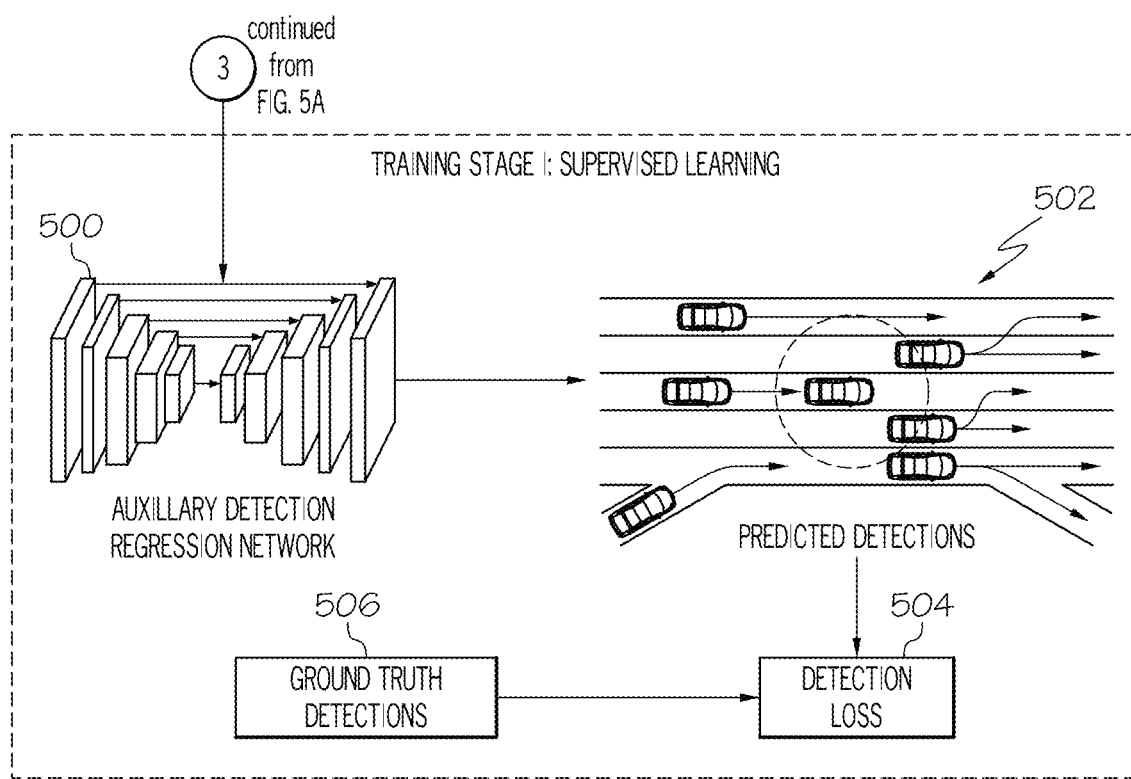
FIG. 5C depicts a schematic diagram of a third portion of an example architecture for training the neural network of FIG. 4, according to one or more embodiments shown and described herein.

Training of the deep neural network 400 may be performed in two stages, as disclosed herein. A schematic illustration of an architecture for training the deep neural network 400 is shown in FIGS. 5A-5C. During a first stage of training, the spatial feature learning network 402 and the temporal feature learning network 404 are disconnected from the decision action network 406 and an auxiliary detection regression network 500 is connected to the pipeline of the neural network 400, as shown in FIGS. 5A and 5C. This truncated version of the neural network 400 is then trained using object detection loss, as disclosed in further detail below. The first stage of training pre-trains the spatial feature learning network 402 and the temporal feature learning network 404 such that training converges more quickly during the second stage of training when the entire neural network 400 is trained.

During the second stage of training, the auxiliary detection regression network 500 is removed from the pipeline of the neural network 400 and the decision action network 406 is reconnected to the pipeline of the neural network 400, as shown in FIGS. 5A and 5B. A decision critic network 508 is also connected to the neural network 400 pipeline and the entire neural network is trained using reinforcement learning. In embodiments, the first stage of training is performed by the first stage training module 308 and the second stage of training is performed by the second stage training module 310, as discussed in further detail below.

Referring back to FIG. 3, the first stage training module 308 may perform the first training stage of the two part training discussed above. As shown in FIGS. 5A and 5C, during the first training stage, the output of the spatial feature learning network 402 is input to the temporal feature learning network 404 and the output of the temporal feature learning network 404 is input to the auxiliary detection regression network 500. The auxiliary detection regression network 500 may comprise one or more CNN layers, fully-connected layers, or other types of neural network architecture.

The auxiliary detection regression network 500 may be trained to predict future locations of vehicles or other road agents 502 based on the spatial temporal feature embeddings 405 received as input. In some examples, the auxiliary detection regression network 500 may utilize regression techniques to make this prediction. The truncated version of the neural network 400 comprising the spatial feature learning network 402, the temporal feature learning network 404, and the auxiliary detection regression network 500 may be trained using training data comprising labeled training examples. Each training example may comprise one or more sensor images taken at one or more first time steps and a ground truth label indicating future locations of vehicles or other road agents at a later time step. For example, a training example may comprise sensor data captured at a times t−2 and t−1, and a ground truth value indicating locations of road agents at a time t.

During the first training stage, the first stage training module 308 may determine a detection loss 504 based on a difference between predicted locations of road agents and the ground truth values 506 of the actual locations of the road agents. The first stage training module 308 may then train the truncated version of the neural network 400 to minimize the detection loss. As such, the spatial feature learning network 402 and the temporal feature learning network 404 may be pre-trained to predict future locations of road agents.

Referring back to FIG. 3, the second stage training module 310 may perform the second stage of the two part training discussed above. As shown in FIGS. 5A and 5B, during the second training stage, the auxiliary detection regression network 500 is disconnected from the neural network 400 pipeline and the decision action network 406 and the decision critic network 508 are connected to the neural network 400 pipeline. The neural network 400 may then be trained using reinforcement learning. In particular, the neural network 400 may be trained using an actor-critic network structure and training method.

In the example of FIG. 5B, the decision action network 406 may output driving decisions 407 and the decision critic network 508 may output an evaluation of the decisions output by the decision action network 406. The decision action network 406 and the decision critic network 508 may then be trained together to maximize the evaluations 510 output by the decision critic network 508 and optimize the driving decisions 407 output by the decision action network 406.

In embodiments, during the second training stage, the second stage training module 310 may train the neural network 400 in an end-to-end manner using reinforcement learning. In particular, a goal for the vehicle 102 may be predefined and the second stage training module 310 may use reinforcement learning to train the neural network 400 based on how closely the driving decisions 407 output by the decision action network 406 adhere to that goal. For example, the predefined goal may be to maximize fuel efficiency, minimize driving time, minimize accelerations, and the like. The second stage training module 310 may train the neural network 400 using reinforcement learning to maximize the predefined goal. Once the neural network 400 is trained, the learned parameters of the neural network 400 may be stored in the data storage component 214. The neural network 400 may then be used to determine driving decisions or driving policy while the vehicle 102 is driving, as discussed above with respect to the spatial feature learning network processing module 302, the temporal feature learning network processing module 304, and the decision action network processing module 306.

In the examples discussed above, the vehicle 102 utilizes sensor data captured by the vehicle sensors 210 of the vehicle 102 to input into the trained neural network 400 to determine optimal driving decisions. However, in some situations, the data captured by the vehicle sensors 210 may be limited. For example, the field of view of the vehicle sensors 210 may be obstructed by vehicles or traffic infrastructure. Accordingly, when the field of view of the vehicle sensors 210 are limited, the performance of the neural network 400 may be limited. As such, in some examples, it may be desirable to receive sensor data from other vehicles.

Referring to FIG. 3, the external vehicle data reception module 312 may receive sensor data from other vehicles. In some examples, the external vehicle data reception module 312 may receive sensor data from other vehicles using V2V communications. In other examples, the external vehicle data reception module 312 may receive sensor data from other vehicles using other communication protocols. In the example of FIG. 1, the vehicle 102 may receive sensor data from the vehicle 104.

Figure 6:
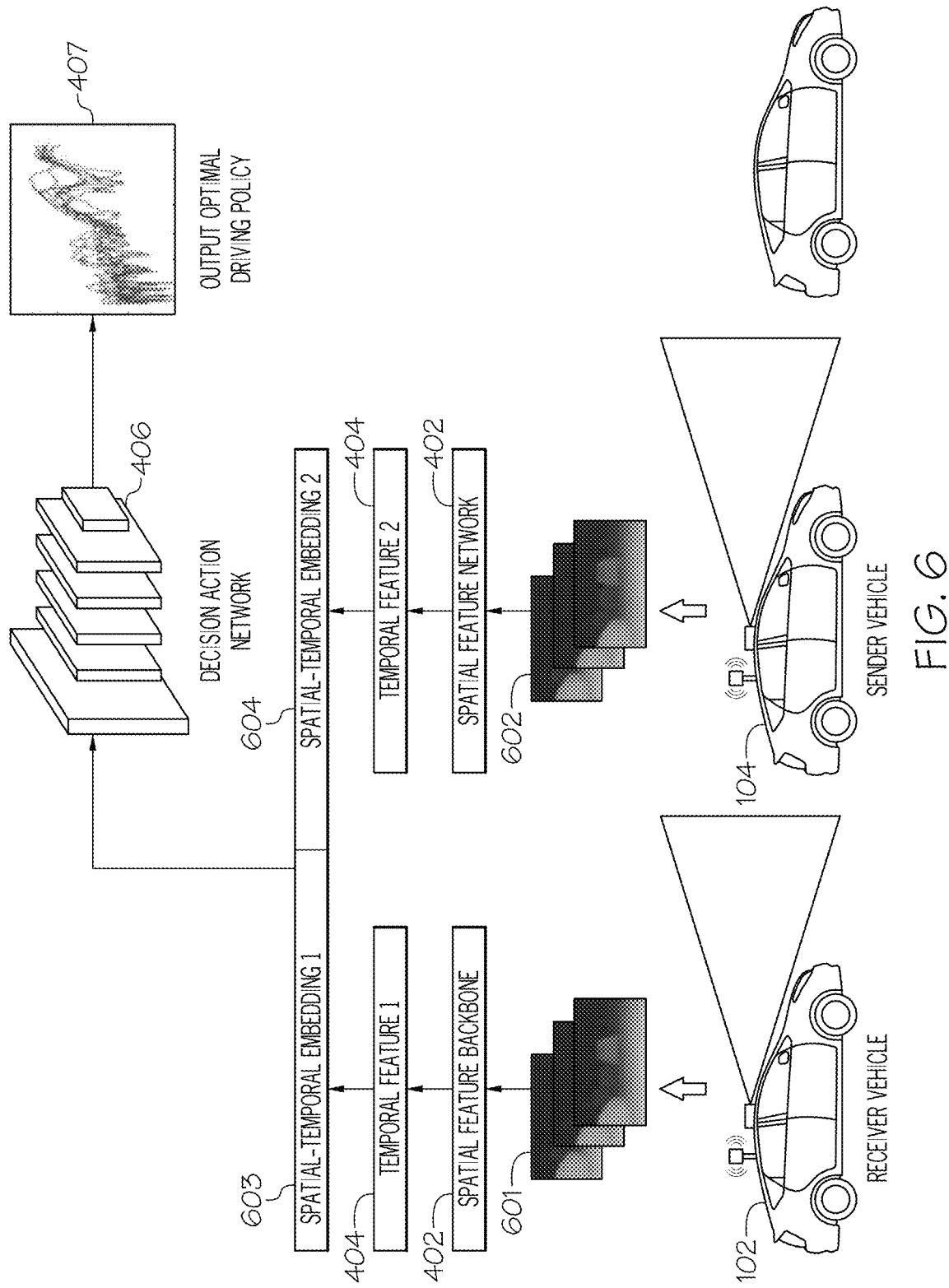
FIG. 6 depicts a schematic diagram of an example architecture for receiving data from multiple vehicles, according to one or more embodiments shown and described herein.

FIG. 6 shows an example of data flow in which one vehicle receives sensor data from another vehicle. In the example of FIG. 6, the vehicle 104 is a sender vehicle and the vehicle 102 is a receiver vehicle. That is, the vehicle 104 sends sensor data to the vehicle 102, which receives the sensor data. Referring back to FIG. 3, the external vehicle data reception module 312 may receive data from other vehicles and the vehicle data transmission module 314 may transmit data to other vehicles, as disclosed herein.

In the example of FIG. 6, the vehicle 102 and the vehicle 104 both include the vehicle system 200 and the memory modules 206. As such, each vehicle has its own trained version of the neural network 400. In the example of FIG. 6, the receiver vehicle 102 and the sender vehicle 104 capture sensor data 601 and 602, respectively. The sensor data 601 and 602 are then input to the spatial feature learning network 402 of the vehicles 102 and 104, respectively. The output of the spatial feature learning network 402 of the vehicles 102 and 104 are then input into the temporal feature learning network 404 of the vehicles 102 and 104, respectively. The temporal feature learning networks 404 of the vehicles 102 and 104 output spatial temporal feature embeddings 603 and 604, respectively. The vehicle data transmission module 314 of the vehicle 104 then transmits the spatial temporal feature embeddings 604 to the vehicle 102, which is received by the external vehicle data reception module 312 of the vehicle 102.

After the external vehicle data reception module 312 receives the spatial temporal feature embeddings 604 from the vehicle 104, the spatial temporal feature embeddings 603 of the vehicle 102 and the spatial temporal feature embeddings 604 of the vehicle 104 are input to the decision action network 406 of the vehicle 102. The decision action network 406 may then output optimal driving policy for the vehicle 102. By utilizing temporal feature embeddings determined by both vehicles 102 and 104 based on sensor data captured by both vehicles, the driving policy output by the decision action network 406 may be more accurate than if the decision action network 406 relied solely on the spatial temporal feature embeddings determined by the vehicle 102 based on the sensor data captured by the vehicle 102.

In the example of FIG. 6, the vehicle 104 transmits spatial temporal feature embeddings to the vehicle 102. However, in other examples, the vehicle 104 may transmit raw sensor data to the vehicle 102. That is, the vehicle data transmission module 314 of the vehicle 104 may transmit sensor data received by the sensor data reception module 300 of the vehicle 104 to the vehicle 102. The external vehicle data reception module 312 may receive the sensor data transmitted by the vehicle 104. The vehicle 102 may then input sensor data received by the sensor data reception module 300 of the vehicle 102 and sensor data received by the external vehicle data reception module 312 from the vehicle 104 to the spatial feature learning network processing module 302. The rest of the neural network 400 may operate as discussed above on the expanded sensor data to determine driving decisions for the vehicle 102.

Figure 7A:
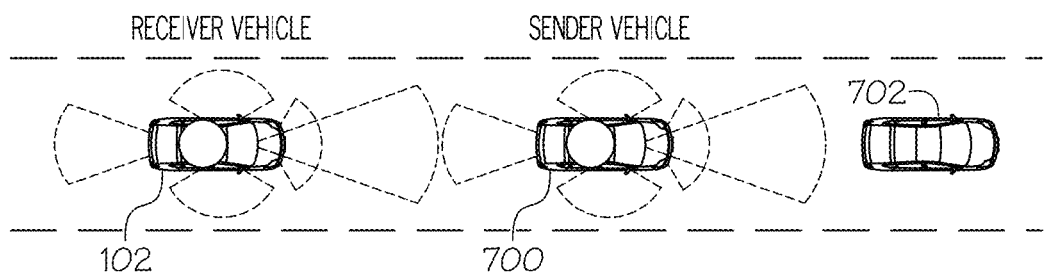
FIG. 7A depicts an example use case of the system for learning optimal driving policy, according to one or more embodiments shown and described herein.
Figure 7B:
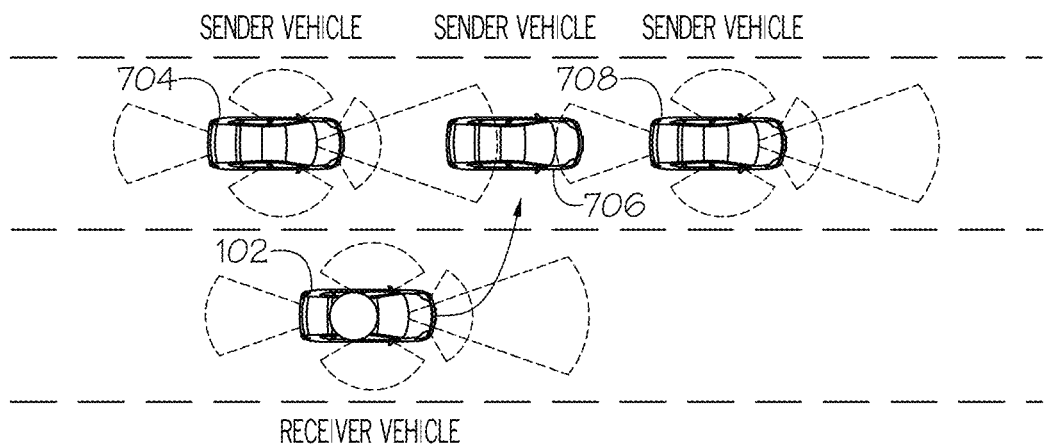
FIG. 7B depicts another example use case of the system for learning optimal driving policy, according to one or more embodiments shown and described herein.

FIGS. 7A and 7B show example situations where receiving data from an external vehicle may be useful. In the example of FIG. 7A, the vehicle 102 is driving behind vehicles 700 and 702. In the example of FIG. 7A, the vehicle 102 desires to minimize fuel consumption. However, the vehicle 700 is positioned between the vehicle 102 and the vehicle 702, thereby preventing the sensors of the vehicle 102 from detecting the vehicle 702. Accordingly, the vehicle 700, which is positioned directly behind the vehicle 702, may be able to better detect the vehicle 702 with its sensor data and may transmit this data to the vehicle 102. This may allow the vehicle 102 to make better driving policy determinations.

In the example of FIG. 7B, the vehicle 102 desires to change lanes into an adjacent lane occupied by vehicles 704, 706, and 708. Accordingly, it may be desirable for the vehicle 102 to receive sensor data from the vehicles 704, 706, 708 since each of those vehicles may be able to better detect accelerations by the vehicle directly in front of them. Accordingly, the vehicles 704, 706, 708 may each transmit data to the vehicle 102.

Figure 8:
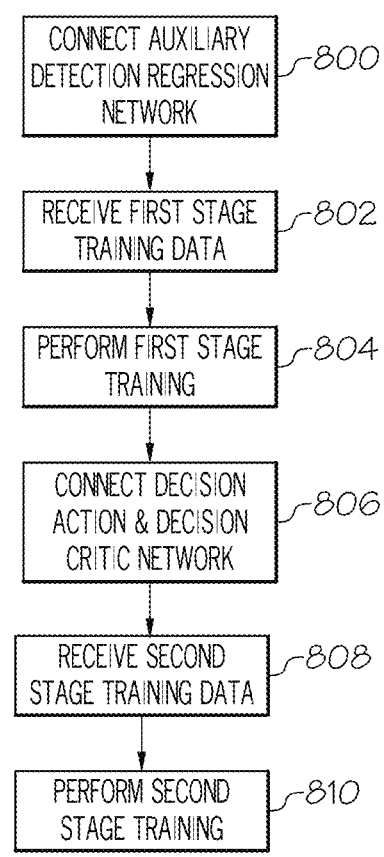
FIG. 8 depicts a flow chart of an example method of training the deep neural network disclosed herein, according to one or more embodiments shown and described herein

FIG. 8 depicts a flowchart of an example method of training the neural network 400, according to one or more embodiments shown and described herein. At step 800, the auxiliary detection regression network 500 is connected to the output of the temporal feature learning network 404 as shown in FIGS. 5A and 5C.

At step 802, the first stage training module 308 receives first stage training data. The first stage training data may be stored in the data storage component 214 or may be received from an external source. Then, at step 804, the first stage training module 308 trains the spatial feature learning network 402, the temporal feature learning network 404, and the auxiliary detection regression network 500 using the first stage training data. A method of performing the first stage training is discussed below in connection with FIG. 9.

At step 806, the auxiliary detection regression network 500 is disconnected from the temporal feature learning network 404 and the decision action network 406 and the decision critic network 508 are connected to the output of the temporal feature learning network 404 as shown in FIGS. 5A and 5B.

At step 808, the second stage training module 310 receives second stage training data. The second stage training data may be stored in the data storage component 214 or may be received from an external source. Then, at step 810, the second stage training module 310 trains the spatial feature learning network 402, the temporal feature learning network 404, the decision action network 406, and the decision critic network 508 using the second stage training data. A method of performing the second stage training is discussed below in connection with FIG. 10.

Figure 9:
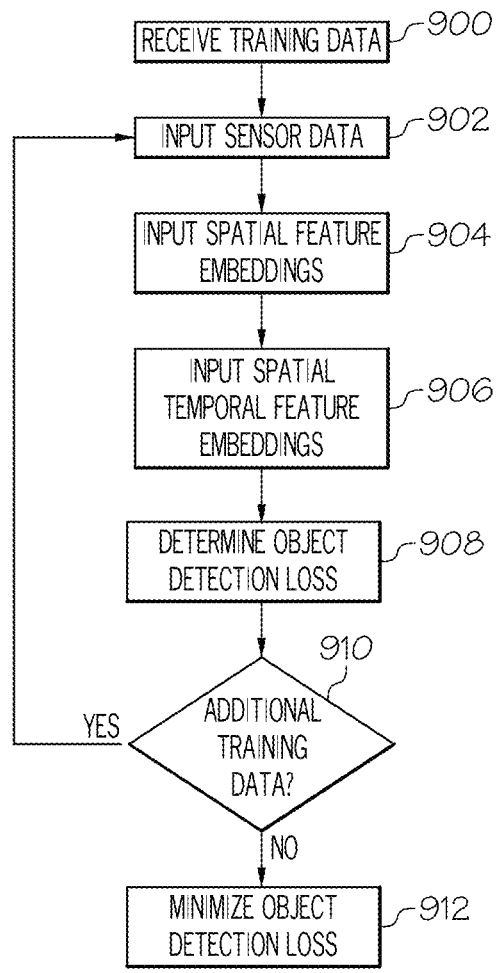
FIG. 9 depicts a flow chart of an example method of performing the first stage of training of the deep neural network disclosed herein, according to one or more embodiments shown and described herein.

FIG. 9 depicts a flowchart of an example method of performing the first training stage of the neural network 400, according to one or more embodiments shown and described herein. During the first training stage, the output of the spatial feature learning network 402 is input to the temporal feature learning network 404 and the output of the temporal feature learning network 404 is input to the auxiliary detection regression network 500, as shown in FIGS. 5A and 5C.

At step 900, the first stage training module 308 receives first stage training data. The first stage training data may comprise a plurality of labeled training examples. Each training example may comprise one or more images captured by the vehicle sensors 210 at one or more time steps and a label comprising locations of road agents at a future time step.

At step 902, the sensor data for one training example is input to the spatial feature learning network 402, which outputs spatial feature embeddings for the training example. At step 904, the spatial feature embeddings output by the spatial feature learning network 402 are input to the temporal feature learning network 404, which outputs spatial temporal feature embeddings. At step 906, the spatial temporal feature embeddings output by the temporal feature learning network 404 are input to the auxiliary detection regression network 500, which outputs predicted locations of road agents.

At step 908, the first stage training module 308 determines an object detection loss based on a difference between the locations of road agents predicted by the auxiliary detection regression network 500 and the ground truth values of the locations of the road agents from the labeled training example.

At step 910, the first stage training module 308 determines whether there are any additional training examples remaining from the first training data. If there are additional training examples (yes at step 910), then control returns to step 902 and the next training example is input to the neural network 400. If there are no additional training examples (no at step 910), then at step 912, the first stage training module 308 minimizes the overall object detection loss for all training examples of the first stage training data.

Figure 10:
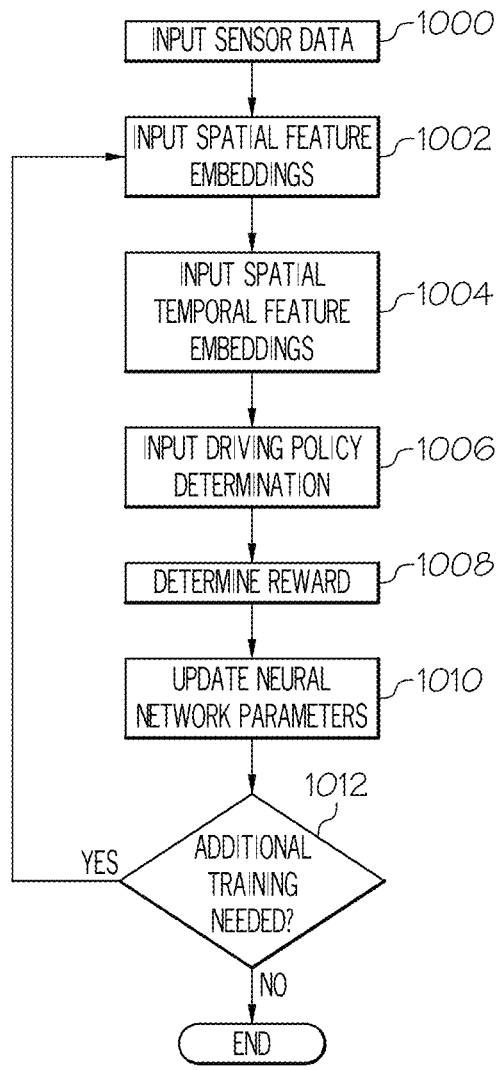
FIG. 10 depicts a flow chart of an example method of performing the second stage of training of the deep neural network disclosed herein, according to one or more embodiments shown and described herein.

FIG. 10 depicts a flowchart of an example method of performing the second training stage of the neural network 400, according to one or more embodiments shown and described herein. During the second training stage, the output of the temporal feature learning network 404 is input to the decision action network 406 and the decision critic network 508, as shown in FIGS. 5A and 5B. In addition, the output of the decision action network 406 is also input to the decision critic network 508, as shown in FIG. 5B.

At step 1000, sensor data captured by the vehicle sensors 210 of the vehicle 102 are input to the spatial feature learning network 402, which outputs spatial feature embeddings. At step 1002, the spatial feature embeddings output by the spatial feature learning network 402 are input to the temporal feature learning network 404, which outputs spatial temporal feature embeddings. At step 1004, the spatial temporal feature embeddings output by the temporal feature learning network 404 are input to the decision action network 406, which outputs a driving policy determination. At step 1006, the spatial temporal feature embeddings output by the temporal feature learning network 404 and the driving policy determination output by the decision action network 406 are input to the decision critic network 508, which outputs an evaluation of the driving policy determination output by the decision action network 406.

At step 1008, the second stage training module 310 determines a reinforcement learning reward based on the state of the vehicle and a predefined goal. At step 1010, the second stage training module 310 updates the parameters of the spatial feature learning network 402, the temporal feature learning network 404, the decision action network 406, and the decision critic network 508 based on the determined reward.

At step 1012, the second stage training module 310 determines whether additional training of the neural network 400 is desired. In some examples, this determination may be based on the rate of convergence of the parameters of the neural network 400. If the second stage training module 310 determines that additional training is needed (yes at step 1012), then control returns to step 1002. If the second stage training module 310 determines that additional training is not needed (no at step 1012), then the method of FIG. 10 ends.

Figure 11:
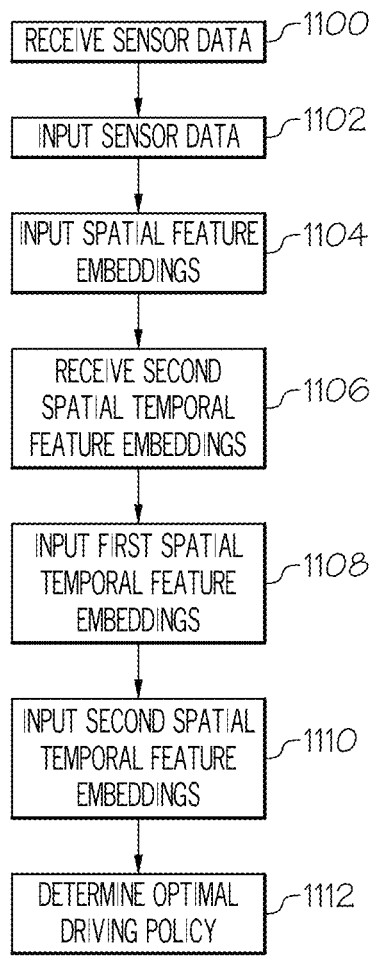
FIG. 11 depicts a flow chart of an example method of operating the system for end-to-end learning of optimal driving policy, according to one or more embodiments shown and described herein.

FIG. 11 shows an example of operating the system 100 when vehicle data is received from multiple vehicles. In the example of FIG. 11, the vehicle 102 receives additional vehicle data from vehicle 104. In the example of FIG. 11, the neural network 400 has been trained using the techniques described above.

At step 1100, the sensor data reception module 300 of the vehicle 102 receives sensor data from the vehicle sensors 210. At step 1102, the spatial feature learning network processing module 302 inputs the received sensor data to the spatial feature learning network 402. The spatial feature learning network processing module 302 then processes the operation of the trained spatial feature learning network 402 and outputs spatial feature embeddings.

At step 1104, the temporal feature learning network processing module 304 inputs the spatial feature embeddings into the temporal feature learning network 404. The temporal feature learning network processing module 304 then processes the operation of the trained temporal feature learning network 404 and outputs spatial temporal feature embeddings.

At step 1106, the decision action network processing module 306 inputs the spatial temporal feature embeddings into the decision action network 406. At step 1108, the external vehicle data reception module 312 of the vehicle 102 receives second spatial temporal feature embeddings from the vehicle 104. At step 1108, the decision action network processing module 306 inputs the second spatial temporal feature embeddings into the decision action network 406.

At step 1110, the decision action network processing module 306 processes the operation of the trained decision action network 406 based on the spatial temporal feature embeddings determined by the vehicle 102 and the second spatial temporal feature embeddings determined by the vehicle 104. Then, at step 1112, the decision action network 406 outputs driving policy decisions and the vehicle 102 determines optimal driving policy based on the output of the decision action network 406.

It should now be understood that embodiment described herein are directed to systems and methods for end-to-end learning of optimal driving policy. A deep neural network may be trained to determine optimal driving policy for an autonomous vehicle based on vehicle sensor data. The deep neural network may comprise a spatial feature learning network, a temporal feature learning network, and a decision action network.

An autonomous vehicle may capture sensor data and input the sensor data into the spatial feature learning network, which may comprise a plurality of CNN layers. The spatial feature learning network may output spatial feature embeddings, which may be input to the temporal feature learning network, which may comprise a RNN comprising a plurality of LSTM layers. The temporal feature learning network may output spatial temporal feature embeddings, which may be input to the decision action network. The decision action network may output optimal driving policy for the vehicle.

In some examples, the vehicle may receive sensor data or spatial temporal feature embeddings from another vehicle. When sensor data is received from another vehicle, the sensor data captured by the vehicle and the sensor data received from the other vehicle may both be input to the spatial feature learning network. When spatial temporal feature embeddings are received from another vehicle, the spatial temporal feature embeddings determined by the vehicle and the spatial temporal feature embeddings received by the other vehicle may both be input to the decision action network.

The deep neural network may be trained in two stages. In a first training stage, the spatial feature learning network and the temporal feature learning network may be connected to an auxiliary detection regression network. The spatial temporal feature embeddings output by the temporal feature learning network may be input to the auxiliary detection regression network. The auxiliary detection regression network may be configured to predict future locations of road agents based on the spatial temporal feature embeddings. The neural network may then be trained end-to-end using object detection loss based on training data comprising ground truth values indicating future locations of road agents.

During a second training stage, the auxiliary detection regression network may be disconnected from the neural network and a decision action network and a decision critic network may be connected to the neural network. The spatial temporal feature embeddings output by the temporal feature learning network may be input to the decision action network and the decision critic network. The decision action network may output driving policy determinations, which may be input to the decision critic network. The decision critic network may be configured to output an evaluation of the driving policy determinations made by the decision action network. The neural network may then be trained end-to-end using reinforcement learning based on a predefined goal for the autonomous vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for learning optimal driving behavior for autonomous vehicles, comprising one or more processors configured to:
   train a neural network, in two stages, to receive sensor data from a vehicle as input and output an optimal driving policy for the vehicle, the neural network comprising a first portion comprising a convolutional neural network configured to receive, as input, images captured by the vehicle and output spatial feature embeddings, a second portion comprising a recurrent neural network configured to receive, as input, the spatial feature embeddings and output spatial temporal feature embeddings, and a third portion comprising a plurality of fully connected layers configured to receive, as input, the spatial temporal feature embeddings and output driving decisions for the vehicle, wherein
   a first stage of training the neural network comprises connecting the first portion and the second portion of the neural network to a first auxiliary neural network portion configured to receive, as input, the spatial temporal feature embeddings, and output predicted locations of road agents to form a second neural network, and training the second neural network to predict future locations of road agents based on current locations of the road agents; and
   a second stage of training the neural network comprises connecting the first portion, the second portion, and the third portion of the neural network to a second auxiliary neural network portion configured to receive, as input, the spatial temporal feature embeddings and the driving decisions, and output an evaluation of the driving decisions to form a third neural network, and training the third neural network to predict optimal driving decisions for the vehicle.

2. The system of claim 1, wherein the first portion of the neural network comprises a plurality of convolutional neural network layers.

3. The system of claim 1, wherein the first portion of the neural network comprises at least an encoder and a decoder.

4. The system of claim 1, wherein the second portion of the neural network comprises a plurality of long short-term memory layers.

5. The system of claim 1, wherein the second portion of the neural network receives as input the spatial feature embeddings output by the first portion of the neural network at a plurality of time steps.

6. The system of claim 1, wherein, during the first stage of training, the one or more processors are configured to train the first portion of the neural network, the second portion of the neural network, and the first auxiliary neural network portion in an end-to-end manner based on training data comprising ground truth values indicating locations of road agents at future time steps using object detection loss.

7. The system of claim 1, wherein, during the second stage of training, the one or more processors are configured to train the first portion of the neural network, the second portion of the neural network, the third portion of the neural network, and the second auxiliary neural network portion in an end-to-end manner using reinforcement learning based on a desired goal associated with driving of the vehicle.

8. The system of claim 7, wherein the one or more processors are configured to, during the second stage of training, train the third portion of the neural network using an actor-critic network structure.

9. The system of claim 8, wherein, during the second stage of training, the second auxiliary neural network portion is configured to receive the spatial temporal feature embeddings and the driving decisions for the vehicle output by the third portion of the neural network as input and output evaluation values of the driving decisions for the vehicle.

10. The system of claim 1, wherein:
    the system is configured to receive second sensor data from a second vehicle; and
    the first portion of the neural network is configured to receive the sensor data from the vehicle and the second sensor data received from the second vehicle as input.

11. The system of claim 1, wherein:
    the system is configured to receive second spatial temporal feature embeddings from a second vehicle; and
    the third portion of the neural network is configured to receive the spatial temporal feature embeddings and the second spatial temporal feature embeddings received from the second vehicle as input.

12. A method comprising:
    training a neural network, in two stages, to receive sensor data from a vehicle as input and output an optimal driving policy for the vehicle, the neural network comprising a first portion comprising a convolutional neural network configured to receive, as input, images captured by the vehicle and output spatial feature embeddings, a second portion comprising a recurrent neural network configured to receive, as input, the spatial feature embeddings and output spatial temporal feature embeddings, and a third portion comprising a plurality of fully connected layers configured to receive, as input, the spatial temporal feature embeddings and output driving decisions for the vehicle, wherein;
    a first training stage comprises connecting the first portion and the second portion of the neural network to a first auxiliary neural network portion configured to receive, as input, the spatial temporal feature embeddings, and output predicted locations of road agents to form a second neural network, and training the second neural network to predict future locations of road agents based on current locations of the road agents; and
    a second training stage comprises connecting the first portion, the second portion, and the third portion of the neural network to a second auxiliary neural network portion to form a third neural network, and training the third neural network to predict optimal driving decisions for the vehicle.

13. The method of claim 12, wherein:
    the first portion of the neural network comprises a plurality of convolutional neural network layers.

14. The method of claim 12, wherein the first training stage comprises training the first portion of the neural network, the second portion of the neural network, and the first auxiliary neural network portion in an end-to-end manner using object detection loss based on training data comprising ground truth values indicating future positions of road agents.

15. The method of claim 12, wherein the second training stage comprises training the second auxiliary neural network portion to maximize an evaluation of the optimal driving decisions for the vehicle.

16. The method of claim 12, wherein the first portion of the neural network comprises at least an encoder and a decoder.

17. The method of claim 12, wherein the second portion of the neural network comprises a plurality of long short-term memory layers.

* * * * *